(12) United States Patent
Chan et al.

(10) Patent No.: US 11,775,654 B2
(45) Date of Patent: Oct. 3, 2023

(54) ANOMALY DETECTION WITH IMPACT ASSESSMENT

(71) Applicant: International Business Machines Corporation, Armonk, NY (US)

(72) Inventors: Yuk L. Chan, Rochester, NY (US); Anuja Deedwaniya, Poughkeepsie, NY (US); Robert M. Abrams, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 17/120,333

(22) Filed: Dec. 14, 2020

(65) Prior Publication Data

US 2022/0188424 A1    Jun. 16, 2022

(51) Int. Cl.
*G06F 21/00*    (2013.01)
*G06F 21/57*    (2013.01)
*G06F 16/901*   (2019.01)
*G06F 9/48*     (2006.01)

(52) U.S. Cl.
CPC .......... *G06F 21/577* (2013.01); *G06F 9/4881* (2013.01); *G06F 16/9024* (2019.01)

(58) Field of Classification Search
CPC ... G06F 21/577; G06F 16/9024; G06F 9/4881
See application file for complete search history.

(56) References Cited

U.S. PATENT DOCUMENTS

| | | | |
|---|---|---|---|
| 10,454,753 B2 | 10/2019 | Sasturkar et al. | |
| 10,594,718 B1 | 3/2020 | Deaguero et al. | |
| 11,153,339 B1 | 10/2021 | Kapoor et al. | |
| 11,190,534 B1 | 11/2021 | Shah et al. | |
| 11,573,954 B1 | 2/2023 | Cornell, Jr. et al. | |
| 2007/0294187 A1 | 12/2007 | Scherrer | |
| 2012/0041575 A1 | 2/2012 | Maeda et al. | |
| 2014/0006325 A1 | 1/2014 | Biem | |
| 2014/0165201 A1 | 6/2014 | Wittenschlaeger | |
| 2015/0033086 A1 | 1/2015 | Sasturkar et al. | |
| 2016/0065604 A1 | 3/2016 | Chen et al. | |
| 2016/0217022 A1 | 7/2016 | Velipasaoglu et al. | |
| 2016/0219066 A1 | 7/2016 | Vasseur et al. | |
| 2017/0005954 A1* | 1/2017 | Shaltiel | H04L 67/564 |
| 2017/0063910 A1 | 3/2017 | Muddu et al. | |
| 2017/0142140 A1 | 5/2017 | Muddu et al. | |

(Continued)

OTHER PUBLICATIONS

List of IBM Patents or Patent Applications Treated as Related; Date Filed: Jan. 20, 2021, 2 pages.

(Continued)

*Primary Examiner* — Jeffrey C Pwu
*Assistant Examiner* — Thong P Truong
(74) *Attorney, Agent, or Firm* — CANTOR COLBURN LLP; Teddi Maranzano

(57) ABSTRACT

Examples described herein provide a computer-implemented method that includes detecting an anomaly associated with an object of a computer system and determining an importance classification of the object. An object relationship of the object is determined with respect to one or more other objects of the computer system. An impact score of the anomaly is determined based on the importance classification and the object relationship. An anomaly report is output with the impact score.

17 Claims, 7 Drawing Sheets

(56) References Cited

U.S. PATENT DOCUMENTS

| | | |
|---|---|---|
| 2018/0307994 A1 | 10/2018 | Cheng et al. |
| 2018/0336353 A1 | 11/2018 | Manadhata et al. |
| 2019/0124104 A1 | 4/2019 | Apostolopoulos |
| 2019/0372827 A1 | 12/2019 | Vasseur et al. |
| 2020/0216097 A1* | 7/2020 | Galula .................... G06F 21/51 |
| 2020/0285997 A1 | 9/2020 | Bhattacharyya |
| 2020/0287927 A1 | 9/2020 | Zadeh et al. |
| 2020/0351283 A1 | 11/2020 | Salunke et al. |
| 2022/0188290 A1 | 6/2022 | Chan et al. |
| 2022/0191226 A1 | 6/2022 | Chan et al. |

OTHER PUBLICATIONS

Chan et al., "Assigning an Anomaly Level to a Non-Instrumented Object," U.S. Appl. No. 17/120,338, filed Dec. 14, 2020.
Chan et al., "Aggregating Results From Multiple Anomaly Detection Engines," U.S. Appl. No. 17/120,335, filed Dec. 14, 2020.

\* cited by examiner

ANOMALY DETECTION WITH IMPACT ASSESSMENT

BACKGROUND

Embodiments described herein generally relate to processing systems, and more specifically, to anomaly detection with impact assessment.

Anomaly detection is the process of identifying data points from a data set that are considered outliers or otherwise fall outside some expected or desired range. As an example, in the case of information technology (IT) data, IT data can be collected from connected processing systems and/or components (or "objects") of the processing systems. The IT data can then be analyzed using anomaly detection techniques to determine whether an anomaly has occurred within the processing systems and/or the components of the processing systems. Discovery of anomalies is useful for diagnostic or proactive alerting. Diagnostics can include identifying the root cause or next step related to problems to enable the problems to be addressed proactively. Proactive alerting includes generating an alert or event based on a detected anomaly for a potential problem.

SUMMARY

Embodiments of the present invention are directed to anomaly detection with impact assessment. A non-limiting example computer-implemented method includes detecting an anomaly associated with an object of a computer system and determining an importance classification of the object. An object relationship of the object is determined with respect to one or more other objects of the computer system. An impact score of the anomaly is determined based on the importance classification and the object relationship. An anomaly report is output with the impact score.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1A:
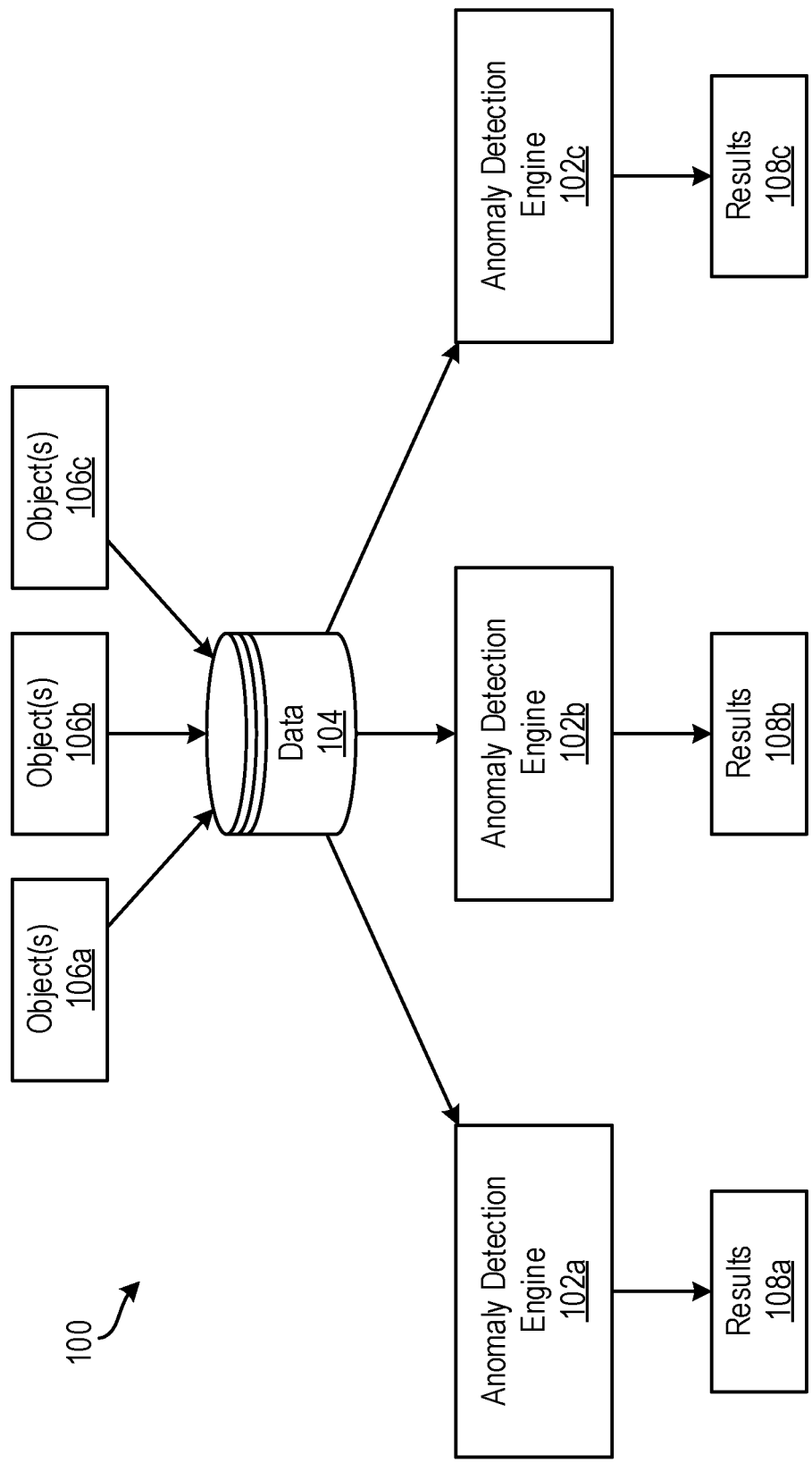
FIG. 1A depicts a block diagram of a system of anomaly detection engines.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for anomaly detection with impact assessment. Anomaly detection is useful for identifying the root cause of problems to enable the problems to be addressed proactively.

There are many anomaly detection engines available for analyzing information technology (IT) data. Anomaly detection can identify objects of a computer system that have warning or failure conditions associated with them. In larger-scale computer systems, the number of possible anomalies identified can be substantial depending on the conditions and thresholds used to identify anomalies. Anomaly detection can also include false positives, where an object, such as a job, server, storage device, or other input/output device appears to have a problem. Some anomalies may be transient in that the anomalies appear occasionally under certain conditions but do not require an effort to resolve. Other anomalies can have a larger-scale impact, particularly where objects have dependencies upon each other. As one example, an anomaly occurring at an object having dependencies can also appear as an anomaly of the dependent objects. This can make it more challenging to resolve the anomalies as one or more objects that appear to have an anomaly may only have a dependency upon an object that requires servicing. By understanding the relationships between objects and the potential impact of anomalies on related objects, the objects having a higher impact and/or anomaly severity can be reported for further analysis, and lower impact and/or anomaly severity can be filtered out to reduce potential false positives.

False positives can also be associated with the use of inconsistent data sources or statistical settings with anomaly detection engines. If anomaly detection engines are set to detect anomalies with detection constraints that are too broadly defined, the number of false positives can increase. False positives can consume resources by unnecessarily recording the false positives and initiating investigation activities. By quantifying the impact of an anomaly using an impact score, lower-impact anomalies can be filtered out. Anomalies having relatively higher impacts and severity can be investigated first. Taking corrective actions against such anomalies can also remove false positives associated with dependent objects.

In embodiments, relationship tracking between objects can be performed by constructing relationship graphs. By analyzing resources used by multiple jobs executing on a computer system, dependency relationships can be discovered or inferred. For example, if ten jobs are executing that all access the same storage device, and all of the jobs have high anomalies, it can be inferred that other jobs using the same storage device may also have or will have anomalies as well. The priority or importance of the jobs can be used to evaluate the importance of the problem. Importance can be defined based on preexisting attributes, user-defined rules, job type, address space accessed, or other such factors.

FIG. 1A depicts an example of a system 100 of anomaly detection engines 102a, 102b, 102c (collectively referred to as "anomaly detection engines 102") that analyze data 104. The data 104 are collected from objects 106a, 106b, 106c (collectively referred to as "objects 106"). The objects can be networks, memory devices, processing devices, applications, etc. The anomaly detection engines 102 can use different anomaly detection algorithms to generate results 108a, 108b, 108c (collectively referred to as "results 108"). The objects 106 may be instrumented to report status or fault information. The data 104 may include logs or records associated with operation of the objects 106.

The techniques described herein address one or more of the shortcomings of the prior art by providing a mechanism to determine an impact score of an anomaly. To do this, one or more embodiments of the present invention can superimpose anomaly detection information of an object (e.g., a resource, a physical component, a logical component, etc.) on a relationship graph (see, e.g., the relationship graph 210 of FIG. 2). The relationship graph can be discovered or manually defined by a subject matter expert. The relationship graph can include objects with dependency relationships.

Figure 1B:
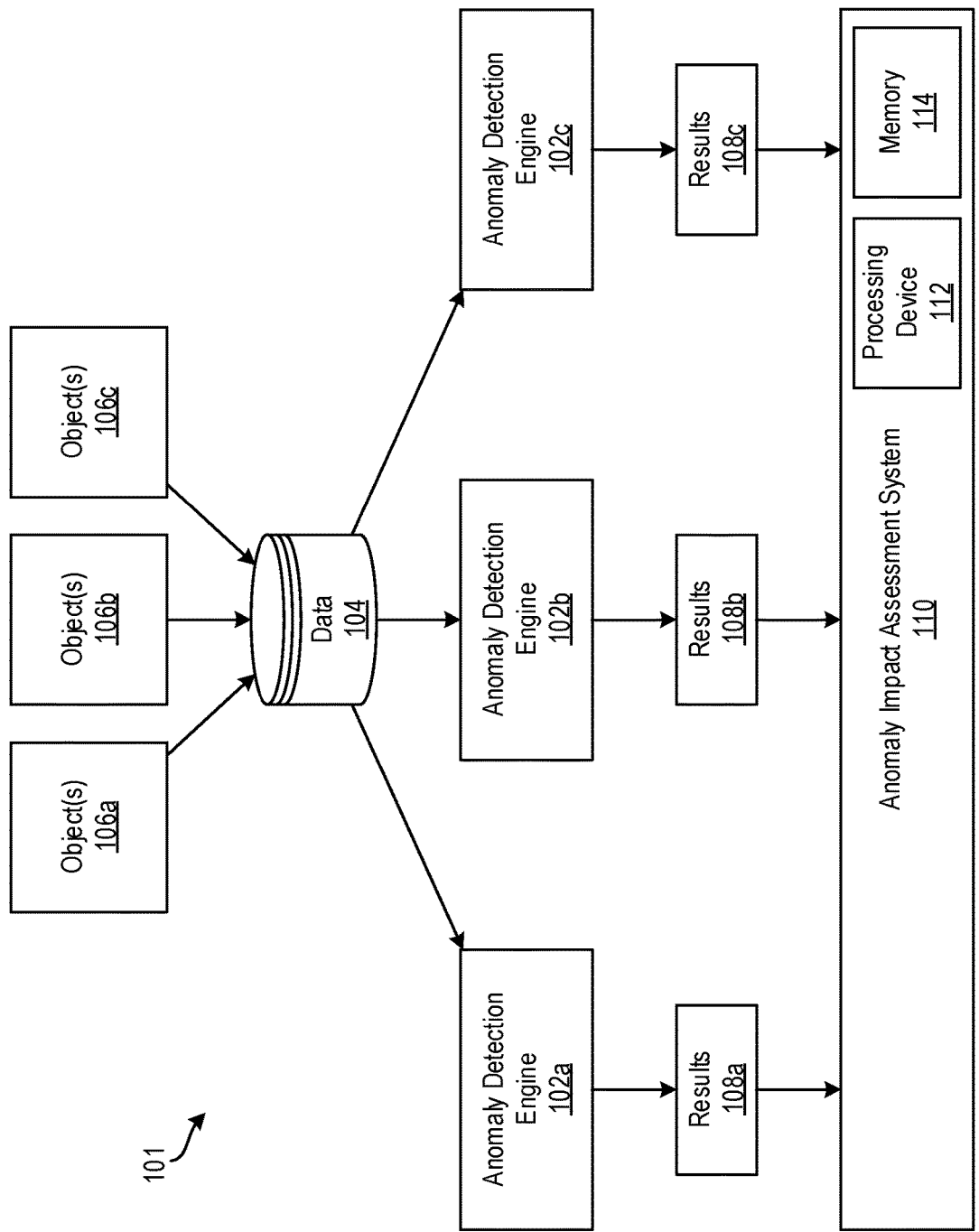
FIG. 1B depicts a block diagram of a system including anomaly detection with impact assessment according to one or more embodiments described herein.

Turning now to FIG. 1B, an example of a system 101 including an anomaly impact assessment system 110 for determining an impact score of an anomaly is depicted according to one or more embodiments described herein. The features and functionality of the anomaly impact assessment system 110, described in more detail herein, can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the features and functionality of the anomaly impact assessment system 110 can be a combination of hardware and programming. The programming can be processor executable instructions stored on a tangible memory, and the hardware can include a processing device 112 for executing those instructions. Thus, a memory 114 can store program instructions that when executed by the processing device 112 implement the features and functionality described herein.

The anomaly impact assessment system 110 uses results (e.g., the results 108) of anomaly detection performed on objects 106 to determine an anomaly level and impact score. The anomaly level may indicate a relative severity of the anomaly, and the impact score can indicate how likely the anomaly will affect other objects 106. The impact score can be a weighted score based on a number of objects 106 impacted and attributes of the objects 106 impacted. The features and functionality of the anomaly impact assessment system 110 are further described in more detail with reference to FIGS. 2 and 3.

Figure 2:
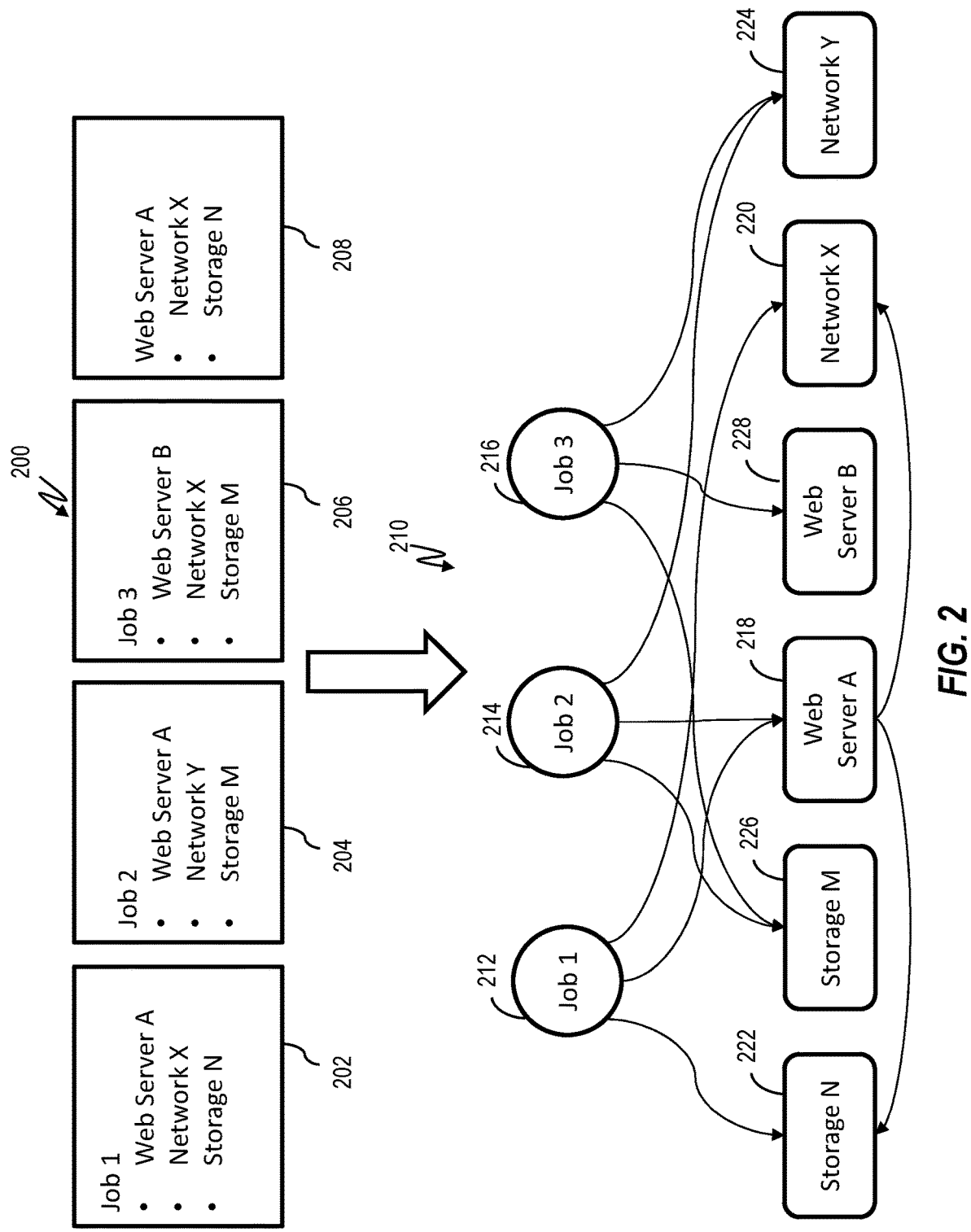
FIG. 2 depicts block diagram of generating a relationship graph according to one or more embodiments described herein.

FIG. 2 depicts a block diagram of a job list 200 and a relationship graph 210 with a plurality of nodes generated based on the job list 200 according to one or more embodiments described herein. The job list 200 can indicate jobs that are currently executing or scheduled to execute in a computer system, such as in computer system 600 of FIG. 6. In the example of FIG. 2, the job list 200 includes job1 202, job2 204, and job3 206. Objects 106 of FIGS. 1A, 1B that jobs 202-206 interface with can be determined through logs, monitors, source code analysis, and/or other techniques. The anomaly impact assessment system 110 of FIG. 1B can generate the relationship graph 210 based on the job list 200 and configuration data 208. The configuration data 208 can define known connections between two or more objects 106. In the example of FIG. 2, job nodes 212, 214, and 216 can be created in the relationship graph 210 to correspond with job1 202, job2 204, and job3 206 respectively. In analyzing job1 202, the anomaly impact assessment system 110 can link job node 212 representing job1 202 with object node 218 representing web server A, object node 220 representing network X, and object node 222 representing storage N. Configuration data 208 may also indicate that web server A 218 is connected with network X and storage N, resulting in secondary links from object node 218 representing web server A to object node 220 representing network X and to object node 222 representing storage N. In analyzing job2 204, the anomaly impact assessment system 110 can link job node 214 representing job2 204 with object node 218 representing web server A, object node 224 representing network Y, and object node 226 representing storage M. In analyzing job3 206, the anomaly impact assessment system 110 can link job node 216 representing job3 206 with object node 228 representing web server B, object node 220 representing network X, and object node 226 representing storage M. In some embodiments, the configuration data 208 can be dynamically discovered through transaction tracking protocol in application performance management tools, such as IBM zAPM Connect. In other embodiments, the configuration data 208 can be discovered from network connect configuration, such as the IBM Discovery Library Adapter.

The anomaly impact assessment system 110 can analyze the relationship graph 210 to determine the impact of anomalies. For example, if there is an anomaly at web server A, the anomaly will impact job1 202 and job2 204 but should not impact job3 206 based on the links of the relationship graph 210. By starting at object node 218 representing web server A 218, the relationship graph 210 can be traversed to discover the impact on job1 202 through job node 212 and job2 204 through job node 214. Traversing the relationship graph 210 from object node 218 can also result in identifying an impact on network X through object node 220 and storage N through object node 222. An importance classification can be determined based on parameters, such as a service class of job1 202 and job2 204. A service class is an example of a classification assigned based on one or more classification rules. For instance, a workload manager that manages job execution can apply a policy with defined classification rules. The policy can classify jobs into a service class with a performance goal (e.g., response time) and an importance of achieving the performance goal. Weight values may also be defined for jobs to support transaction routing, for example, using address spaces. An importance classification can indicate a higher importance for job1 202 if the service class is set to a high-priority job as compared to a lower importance for job2 204 if the service class is set to a discretionary job. The importance classifications can be translated into impact scores in combination with considering object relationships. For instance, an impact score can be weighted based on a count of impacted objects and importance of the objects based on the importance classification and/or other attributes. An object or job that targets an address space associated with ranges identified as privileged may be considered to have a higher importance. User-defined rules or machine-learning based rules can also be applied to determine importance classification and impact scores.

Figure 3:
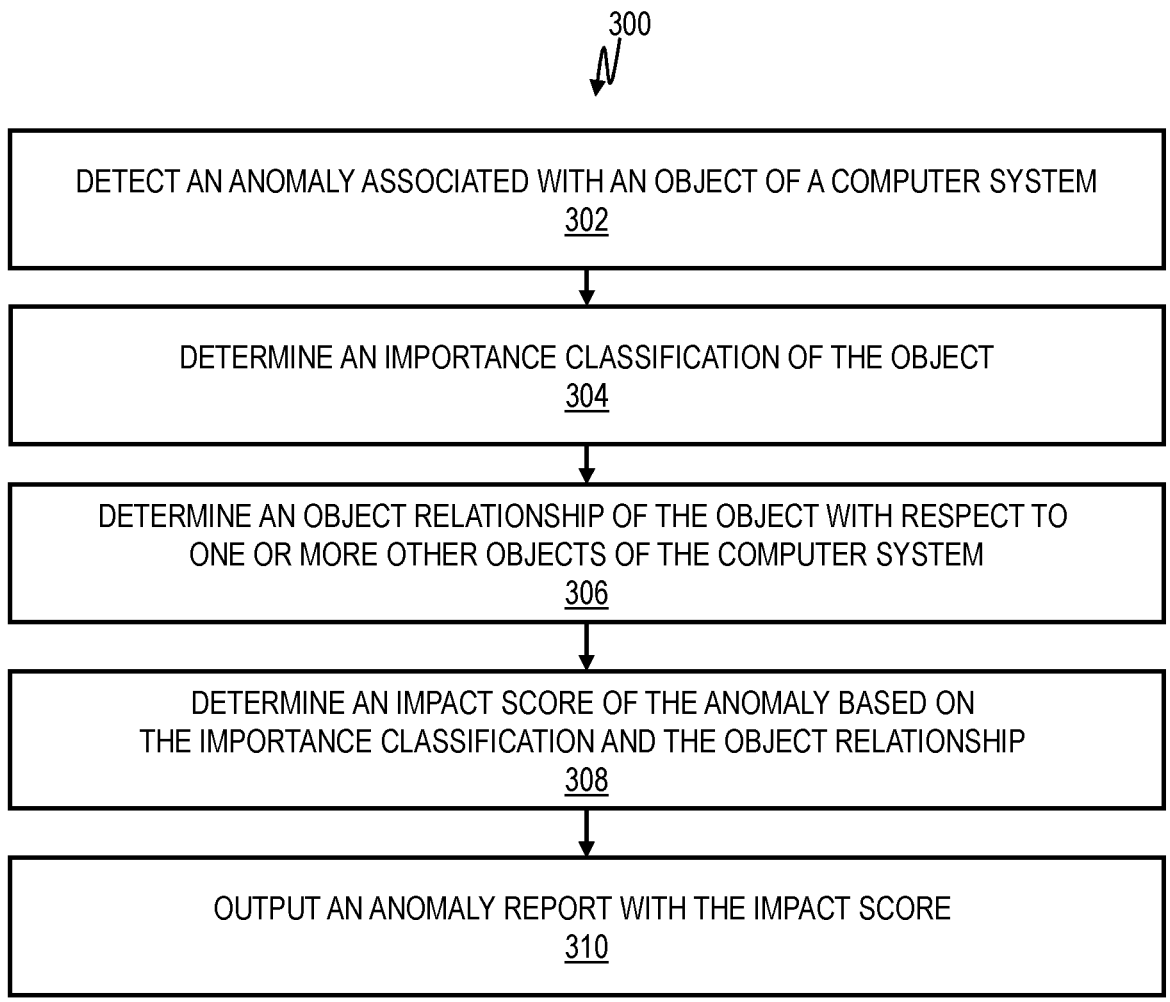
FIG. 3 depicts a flow diagram of a method for anomaly detection with impact assessment according to one or more embodiments described herein.

FIG. 3 depicts a flow diagram of a method 300 for anomaly detection with impact assessment according to one or more embodiments described herein. The method 300 can be implemented using any suitable system (e.g., the anomaly impact assessment system 110, the computer system 600 of FIG. 6, etc.) and/or any suitable device (e.g., the processing device 112, one or more of the processors 621a, 621b, 621c of FIG. 6, etc.). The method 300 is described with respect to FIGS. 1-6.

At block 302, an anomaly associated with an object of a computer system can be detected. Anomaly detection can be performed by the anomaly detection engines 102 with respect to objects 106, with anomaly detection results provided as results 108 to the anomaly impact assessment system 110.

At block 304, an importance classification of the object 106 can be determined. The anomaly impact assessment system 110 can use existing service class designations to determine a relative importance classification. Other attributes can be used in combination or in the alternative to define the importance classification as previously described.

At block 306, an object relationship of the object 106 can be determined with respect to one or more other objects 106 of the computer system. The object relationships can be determined as part of creating the relationship graph 210. A plurality of jobs 202-206 can be configured to execute on the computer system 600, and one or more objects 106 can be associated with execution of the jobs 202-206. The relationship graph 210 can be constructed to include a plurality of nodes that link the jobs 202-206 with the one or more objects 106. The object relationship of the object 106 can be determined with respect to the one or more other objects 106 of the computer system 600 by analyzing the relationship graph 210 to identify dependencies between the jobs 202-206 in job nodes 212-216 and the one or more objects 106 in object nodes 218-228.

At block 308, an impact score of the anomaly can be determined based on the importance classification and the object relationship. The anomaly impact assessment system 110 can traverse nodes of the relationship graph 210 to consider importance classifications in combination with links between nodes indicating dependencies between objects 106 and/or jobs 202-206. The impact score can be based on a combination of a historical relationship and a current value of the object relationship. For instance, the impact score can include a weighted average of previously collected and new object relationships such that relationships learned during execution of previous jobs are considered in part as newer jobs are deployed. The impact score can distinguish between a high priority, a discretionary priority, and an unknown priority. An unknown priority may be set to a relative value below or above discretionary priority depending on whether a more or less conservative approach is preferred. The impact score can be based on one or more user-defined rules, an address space, or process accessed.

At block 310, an anomaly report with the impact score can be output. The anomaly report can be sent to a diagnostic application for further actions or sent to one or more administrators to perform further corrective actions. The anomaly report can be filtered to prevent anomalies having an impact score below a reporting threshold from being included, thereby reducing the reporting of false positives and low-impact issues.

In some examples, for each type of object (e.g., a memory, a storage device, etc.), the anomaly impact assessment system 110 can normalize the impact score. For example, the impact score for each type of object can be normalized to a scale of 0-10, a scale of 0-100, or another suitable scale.

The impact score determined by the anomaly impact assessment system 110 can be used in a number of ways. For example, the impact score can be used to determine whether a detected anomaly should be reported. As another example, the impact score can be used to trigger diagnostics targeting specific objects. As yet another example, the impact score can be used to determine an order of troubleshooting to focus on higher impact anomalies before lower impact anomalies.

Additional processes also may be included. For example, the anomaly impact assessment system 110 can determine whether the overall impact score for at least one of the nodes in the relationship graph 210 exceeds a threshold. The threshold can be predetermined, can be automatically set by the anomaly impact assessment system 110, can be learned over time by the anomaly impact assessment system 110 (e.g., using machine learning techniques), can be based on historical data, can be manually set/adjusted by a system administrator, and/or combinations thereof. Then, responsive to determining that the impact score for the at least one of the nodes exceeds the threshold, the anomaly impact assessment system 110 can cause an action to be taken to remedy an anomaly associated with the impact score that exceeds the threshold.

It should be understood that the process depicted in FIG. 3 represents an illustration, and that other processes may be added or existing processes may be removed, modified, or rearranged without departing from the scope of the present disclosure.

Example embodiments of the disclosure include or yield various technical features, technical effects, and/or improvements to technology. Example embodiments of the disclosure provide an anomaly impact assessment system configured to determine the impact of anomalies with respect to related objects. These aspects of the disclosure constitute technical features that yield the technical effect of proactive identification and correction of problems within a system. For example, anomalies deemed to have a lower impact score can be filtered to reduce the reporting of false positives and direct corrective actions to anomalies having a greater overall impact. As a result of these technical features and technical effects, an anomaly impact assessment system in accordance with example embodiments of the disclosure represents an improvement to existing anomaly detection and handling techniques. It should be appreciated that the above examples of technical features, technical effects, and improvements to technology of example embodiments of the disclosure are merely illustrative and not exhaustive.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
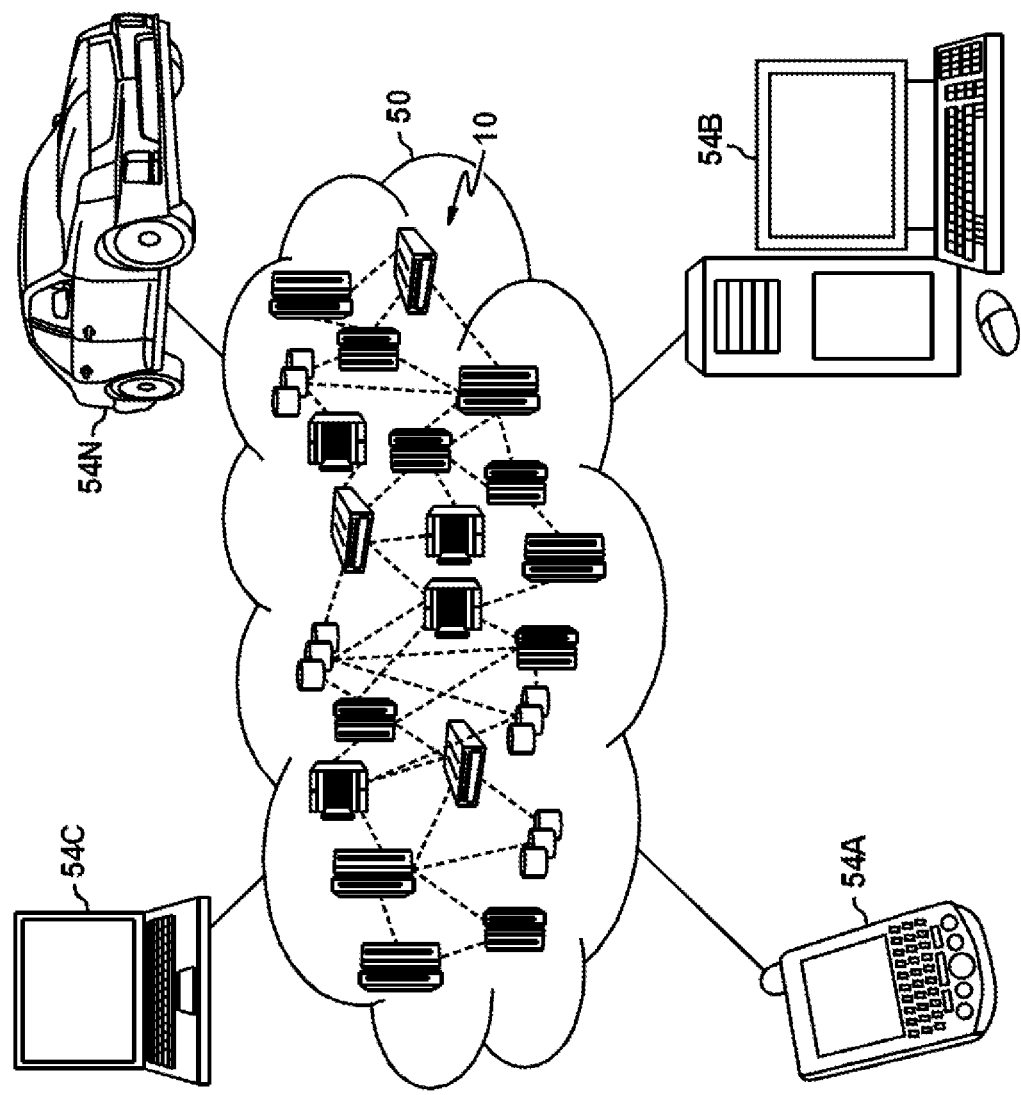
FIG. 4 depicts a cloud computing environment according to one or more embodiments described herein.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
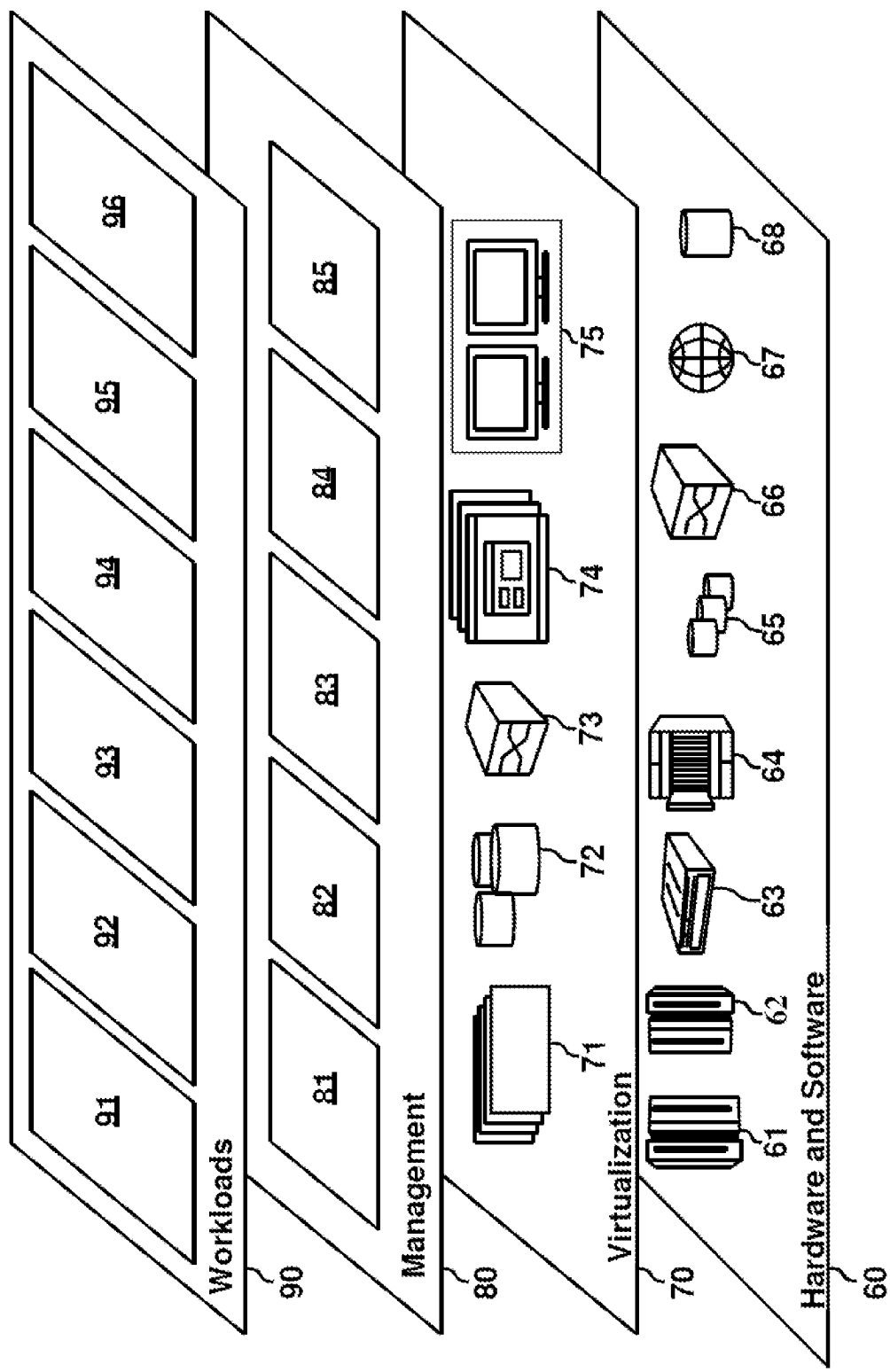
FIG. 5 depicts abstraction model layers according to one or more embodiments described herein.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96.

Figure 6:
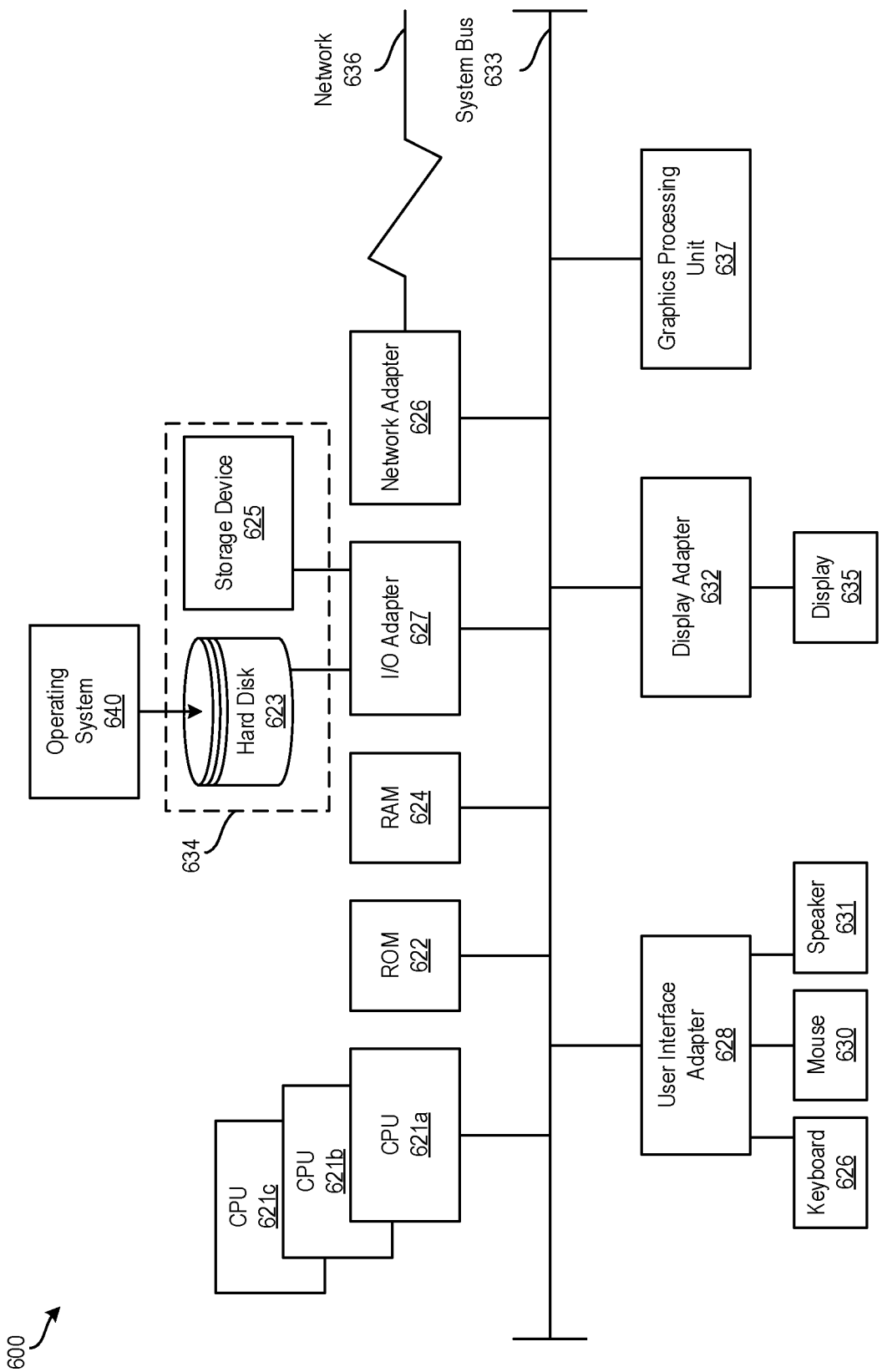
FIG. 6 depicts a block diagram of a computer system for implementing the presently described techniques according to one or more embodiments described herein.

It is understood that one or more embodiments described herein is capable of being implemented in conjunction with any other type of computing environment now known or later developed. For example, FIG. 6 depicts a block diagram of a computer system 600 for implementing the techniques described herein. In accordance with one or more embodiments described herein, the computer system 600 is an example of a cloud computing node 10 of FIG. 4. In examples, computer system 600 has one or more central processing units ("processors" or "processing resources") 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of computer system 600.

Further depicted are an input/output (I/O) adapter 627 and a network adapter 626 coupled to system bus 633. I/O adapter 627 may be a small computer system interface (SCSI) adapter that communicates with a hard disk 623 and/or a storage device 625 or any other similar component. I/O adapter 627, hard disk 623, and storage device 625 are collectively referred to herein as mass storage 634. Operating system 640 for execution on computer system 600 may be stored in mass storage 634. The network adapter 626 interconnects system bus 633 with an outside network 636 enabling computer system 600 to communicate with other such systems.

A display (e.g., a display monitor) 635 is connected to system bus 633 by display adapter 632, which may include a graphics adapter to improve the performance of graphics intensive applications and a video controller. In one aspect of the present disclosure, adapters 626, 627, and/or 632 may be connected to one or more I/O busses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. A keyboard 629, mouse 630, and speaker 631 may be interconnected to system bus 633 via user interface adapter 628, which may include, for example, a Super I/O chip integrating multiple device adapters into a single integrated circuit.

In some aspects of the present disclosure, computer system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing, and has a highly parallel structure that makes it more effective than general-purpose CPUs for algorithms where processing of large blocks of data is done in parallel.

Thus, as configured herein, computer system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store the operating system 640 such as the AIX® operating system from IBM Corporation to coordinate the functions of the various components shown in computer system 600. Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
analyzing a plurality of jobs configured to execute on a computer system;
determining one or more objects associated with execution of the jobs;
constructing a relationship graph comprising a plurality of nodes that link the jobs with the one or more objects;
detecting an anomaly associated with an object of the computer system;
determining an importance classification of the object;
determining an object relationship of the object with respect to one or more other objects of the computer system based on the relationship graph;
determining an impact score of the anomaly based on the importance classification and the object relationship; and
outputting an anomaly report with the impact score.

2. The computer-implemented method of claim 1, wherein determining the object relationship of the object with respect to the one or more other objects of the computer system comprises analyzing the relationship graph to identify dependencies between the jobs and the one or more objects.

3. The computer-implemented method of claim 1, wherein the impact score is based on a combination of a historical relationship and a current value of the object relationship.

4. The computer-implemented method of claim 1, wherein the impact score distinguishes between multiple levels of priority comprising: a high priority, a discretionary priority, and an unknown priority.

5. The computer-implemented method of claim 1, wherein the impact score is based on one or more user-defined rules.

6. A system comprising:
a memory comprising computer readable instructions; and
a processing device for executing the computer readable instructions, the computer readable instructions controlling the processing device to perform operations comprising:
analyzing a plurality of jobs configured to execute on a computer system;
determining one or more objects associated with execution of the jobs;
constructing a relationship graph comprising a plurality of nodes that link the jobs with the one or more objects;
detecting an anomaly associated with an object of the computer system;
determining an importance classification of the object;
determining an object relationship of the object with respect to one or more other objects of the computer system based on the relationship graph;
determining an impact score of the anomaly based on the importance classification and the object relationship; and
outputting an anomaly report with the impact score.

7. The system of claim 6, wherein determining the object relationship of the object with respect to the one or more other objects of the computer system comprises analyzing the graph to identify dependencies between the jobs and the one or more objects.

8. The system of claim 6, wherein the impact score is based on a combination of a historical relationship and a current value of the object relationship.

9. The system of claim 6, wherein the impact score distinguishes between multiple levels of priority comprising: a high priority, a discretionary priority, and an unknown priority.

10. The system of claim 6, wherein the impact score is based on one or more user-defined rules.

11. A computer program product comprising a computer readable storage medium having program instructions embodied therewith, the program instructions executable by a processor to cause the processor to perform operations comprising:
analyzing a plurality of jobs configured to execute on a computer system;
determining one or more objects associated with execution of the jobs;
constructing a relationship graph comprising a plurality of nodes that link the jobs with the one or more objects;
detecting an anomaly associated with an object of the computer system;
determining an importance classification of the object;
determining an object relationship of the object with respect to one or more other objects of the computer system based on the relationship graph;
determining an impact score an impact score of the anomaly based on the importance classification and the object relationship; and
outputting an anomaly report with the impact score.

12. The computer program product of claim 11, wherein determining the object relationship of the object with respect to the one or more other objects of the computer system comprises analyzing the relationship graph to identify dependencies between the jobs and the one or more objects.

13. The computer program product of claim 11, wherein the impact score is based on a combination of a historical relationship and a current value of the object relationship, and the impact score distinguishes between multiple levels of priority comprising: a high priority, a discretionary priority, and an unknown priority.

14. The computer program product of claim 11, wherein the impact score is based on one or more user-defined rules.

15. The computer-implemented method of claim 1, further comprising:
determining whether the impact score exceeds a threshold; and causing an action to be taken to remedy the anomaly associated with the impact score that exceeds the threshold.

16. The system of claim 6, wherein the computer readable instructions controlling the processing device are configured to perform operations comprising:
    determining whether the impact score exceeds a threshold; and
    causing an action to be taken to remedy the anomaly associated with the impact score that exceeds the threshold.

17. The computer program product of claim 11, wherein the program instructions are executable by the processor to cause the processor to perform operations comprising:
    determining whether the impact score exceeds a threshold; and
    causing an action to be taken to remedy the anomaly associated with the impact score that exceeds the threshold.

\* \* \* \* \*